April 17, 1956 S. W. SEELEY 2,742,573

CRYSTAL CONTROLLED OSCILLATORS

Filed Sept. 28, 1951

INVENTOR
Stuart W. Seeley
BY
Charles H. Brown
ATTORNEY

United States Patent Office 2,742,573
Patented Apr. 17, 1956

2,742,573

CRYSTAL CONTROLLED OSCILLATORS

Stuart William Seeley, Roslyn Heights, N. Y., assignor to Radio Corporation of America, a corporation of Delaware Application September 28, 1951, Serial No. 248,855

The terminal 15 years of the term of the patent to be granted has been disclaimed 7 Claims. (Cl. 250—36)

The invention relates to crystal controlled vacuum tube oscillators, and it particularly pertains to circuit arrangements for improving the frequency stability of such oscillators.

Hitherto, attempts have been made to combine the frequency stabilization properties of a plurality of piezo-electric crystals in order to increase the frequency stability of crystal controlled oscillators. In so far as is known, the crystals employed in the suggested circuits were operated in the high impedance, parallel resonant mode. In these alternates stray coupling between the crystals then tended to produce the equivalent of an undesirable band-pass effect which broadened the resonance curve and thereby reduced the frequency stability. In some cases, separating the crystals by as much as ten feet did not eliminate the stray coupling between the crystals or otherwise diminish the harmful effects.

An object of the invention, therefore, is to increase the frequency stability of crystal controlled oscillators.

Another object is to provide a source of oscillations whose frequency is highly stable under relatively large variations in operating conditions, such as variations in the temperature of the circuit elements other than the crystals and variations in the supply voltages.

A further object of the invention is to provide a circuit arrangement employing a plurality of piezo-electric crystals substantially completed decoupled from each other and combining the individual frequency stabilizing properties to achieve a high degree of frequency stabilization.

The objects of the invention are attained in a circuit arrangement having a piezo-electric crystal operating at a given frequency in the high impedance parallel resonance mode connected in the grid circuit of an electron discharge device. Another piezo-electric crystal, operating at the low impedance series resonant mode at the same given frequency is connected in the cathode-anode path of the discharge device. This cathode crystal presents an inductive or capacitive reactance if the oscillator frequency is higher or lower respectively than the given frequency. This effect tends to return the frequency of the oscillator to the given operating frequency.

The invention will be found advantageous in application to existing oscillator circuits as well as in the design of new circuits.

The addition of a relatively inexpensive crystal to an existing crystal oscillator in accordance with the invention will serve to increase the stability of the oscillator by a factor of fifty or more.

Specific embodiments of the invention, given by way of example only, are described hereinafter with reference to the accompanying drawing forming a part of the specification and in which.

Figures 1, 2, 3A:
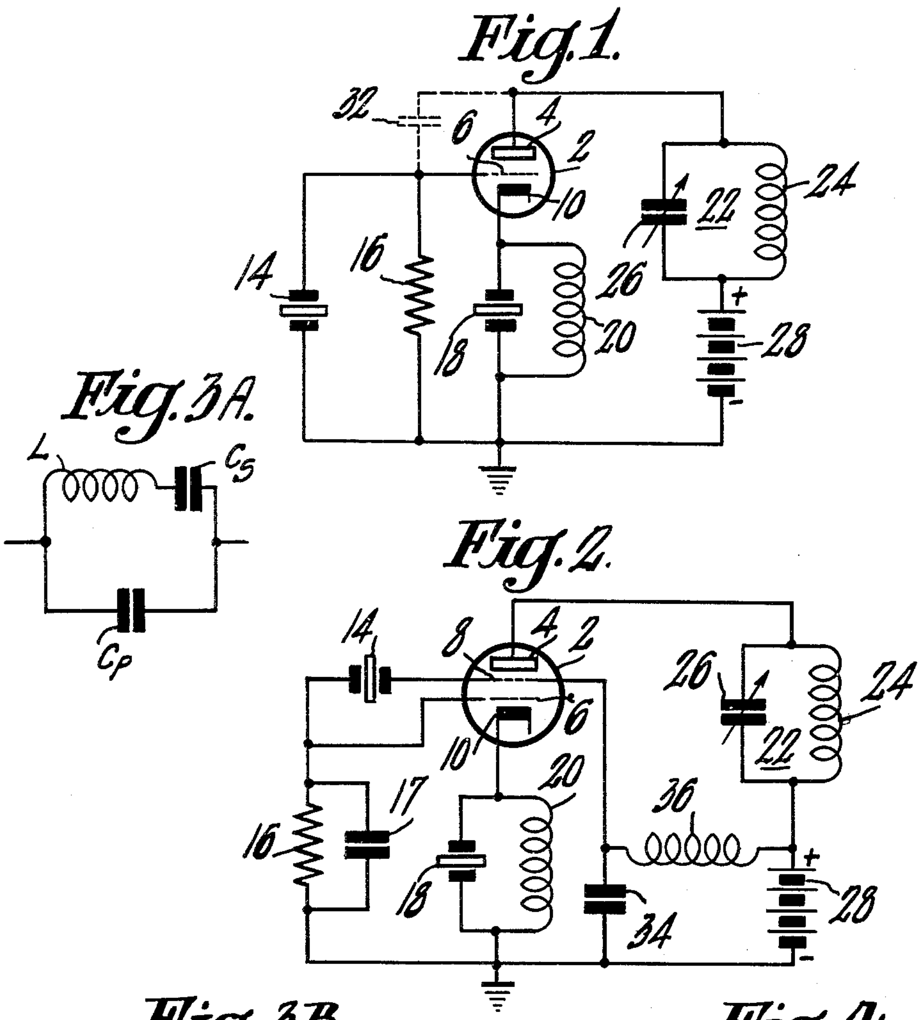
Fig. 1 illustrates a triode crystal oscillator embodying the invention.
Fig. 2 shows a modification of the arrangement of Fig. 1 employing a tetrode tube.
Fig. 3A is an electrically equivalent circuit of a piezo-electrical crystal and Fig. 3B is a graphical representation of the reactance of a piezo-electric crystal as a function of frequency.

Referring to Fig. 1, there is shown a crystal controlled vacuum tube oscillator comprising a triode tube 2 having an anode 4, a control grid 6 and a cathode 10. A piezo-electric crystal 14 is connected between the control grid 6 and ground. A grid resistor 16 is connected in parallel with the grid crystal 14 to provide a D. C. path for grid bias for the tube 2. A radio frequency choke 20 or other impedor is arranged to provide a D. C. path between the cathode 10 and ground. A tuned circuit 22, comprising an inductance 24 and a variable capacitor 26 connected in parallel, is connected between the anode 4 and the positive terminal of a D. C. voltage source 28. The negative terminal of the source 28 is connected to ground. The grid-anode interelectrode capacity of the tube 2 is represented by the capacitor 32 shown in dotted lines.

In the operation of the circuit shown in Fig. 1 as thus far described the tuned circuit 22 is adjusted to provide inductive reactance at the parallel resonant frequency of the crystal 14, and energy will be fed back from the anode to the grid by way of the grid-anode capacity 32. Sustained oscillation will occur at the parallel resonant frequency of the crystal 14. The reason for oscillation at this frequency can be readily understood by referring to Figs. 3A and 3B. The reactance of a typical crystal is negative at low frequencies and becomes zero at the series resonant frequency $F_s$ of inductor L and capacitor $C_s$, representing the equivalent inductance and series capacity of the crystal element itself. As the frequency increases the reactance becomes positive and very large at the parallel resonant frequency $F_p$ of the entire circuit of Fig. 3A, which includes the shunted capacitor $C_p$, representing the capacity of the crystal holder and stray circuit capacities. The oscillator will oscillate only in the portion of the crystal characteristic curve representing positive reactance. Since the difference in frequencies $F_p$ and $F_s$ is actually very small the frequency stabilization is quite good. However, the value of the capacitor $C_p$ may vary due to variations in the tube electrode structure, in the anode voltage and due to other causes, thus reducing the frequency stability of the oscillator correspondingly. According to the invention, a tremendous increase in the stability of a crystal oscillator is achieved by utilizing the highly stable series resonance frequency characteristic of a piezo-electric crystal which remains substantially unaffected by external changes in the operating conditions.

Figure 3B:
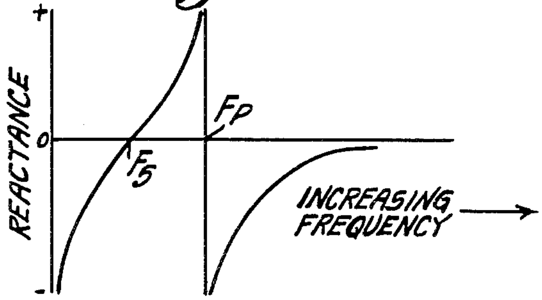
Figure 4:
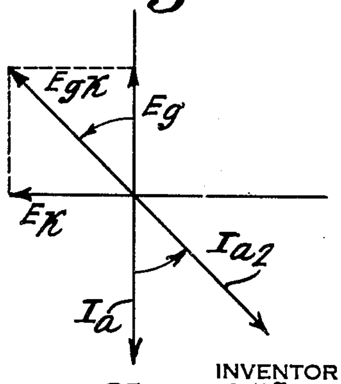
Fig. 4 is a vector diagram given in explanation of the operation of the embodiments of the invention shown in Figs. 1 and 2.

In accordance with the invention a crystal 18, chosen to have a series resonant frequency $F_s$ equal to the given oscillator operating frequency as determined by the crystal 14 is connected between the cathode 10 and ground. The cathode choke 20 shunting the cathode crystal 18 is preferably chosen to have an inductive reactance approximately equal to the capacitive reactance of the capacitor $C_p$, although this is not necessary to the operation of the invention. It is necessary only that the reactance of the choke 20 be large with respect to the impedance of the crystal 18. When the oscillator is exactly on operating frequency the cathode crystal 18 will have zero reactance as indicated in Fig. 3B. Strictly speaking, a resistor should be shown in series with the inductor L and the capacitor $C_s$ of the equivalent electrical circuit to represent various energy losses of the crystal; however, this can be ignored in view of the very high Q of crystals presently available. For purposes of explanation, the anode circuit is assumed to be purely resistive in order to represent the anode current $I_a$ as being 180° out of phase with the grid voltage $E_g$ as shown in Fig. 4. More exactly, the anode current $I_a$ is a function of the voltage between the grid and the cathode. When the oscillator is exactly on the operating frequency there will be no voltage between the cathode 10 and ground, since the equivalent resistance is assumed to be zero shorting the cathode choke 20. The anode current $I_a$ can then be represented as being solely a function of the voltage $E_g$ across the grid crystal 14.

If the oscillator drifts lower in frequency the cathode crystal 18 becomes capacitively reactive as indicated in Fig. 3B. Consequently, an additional quadrature voltage, effectively leading the crystal voltage $E_g$, is developed between the grid 6 and the cathode 10 and is represented by the vector $E_k$. Since the anode current is controlled by the sum of the grid and cathode voltages $E_{gk}$, which are added vectorially as indicated in Fig.4, $E_{gk}$ leads the original controlling voltage $E_g$. The $I_a$ vector is thus caused to increase in velocity of rotation to remain substantially 180° out of phase with the control voltage $E_{gk}$, as indicated by vector $I_{a2}$, increasing the frequency of oscillation. Raising the frequency of operation of the oscillator acts to reduce the capacitive reactance effect of the crystal 18 until the oscillator returns to the given operating frequency, and the frequency drift is corrected. In other words, the oscillator operates as if the grid circuit was tuned to a higher frequency which is the equivalent to putting an inductance in parallel with the grid crystal 14. In a similar manner, if the oscillator drifts to a higher frequency, the cathode crystal 18 becomes effectively inductive to lower the frequency and eliminate the frequency variation.

To indicate the increased frequency stability the following test was made: a crystal oscillator of the type indicated in Fig. 1 but with a resistor and by-pass condenser replacing the cathode circuit illustrated, was operated at a frequency of 3.580 megacycles. The anode supply voltage 28 was adjusted to be 30 volts. When the anode potential was changed an amount equal to twenty percent, or from 30 to 36 volts, a resultant observable change of frequency occurred. A similar test was made with the appropriate cathode crystal in the circuit in accordance with the invention. A tenfold increase in anode potential, from 30 to 300 volts, was made with less frequency variation than previously observed. In other words, the stability of the oscillator was increased by a factor of more than fifty to one. This could mean that a broadcast transmitter oscillator stabilized by temperature control and other means to reduce frequency drift to an amount not greater than ten cycles from the assigned frequency would have a maximum frequency drift of one-fifth of a cycle if both crystals were temperature controlled to hold within that tolerance.

The fact that both crystals do not operate in the high impedance mode effectively decouples them and eliminates the resultant band passing effects existing because of stray coupling in circuits utilizing two or more crystals both operated in the parallel resonant mode.

The embodiment shown in Fig. 2 is somewhat similar to that shown in Fig. 1 except that a tetrode is used with the crystal between the screen grid 8 and the control grid 6 providing the feed-back means. Where the same element is involved the same reference numerals are employed in both figures. In the operation of the circuit of Fig. 2 the screen grid will function effectively as an anode or output electrode, and the crystal 14 will operate at a frequency near its parallel resonance mode to provide a high reactance component in order to obtain proper phase of potentials on the grid. A radio frequency choke 36 is connected between the screen grid 8 and the voltage source 28 to furnish the inductive reactance to initiate oscillation in the section of the tube comprising the cathode 10, control grid 6 and screen grid 8. A capacitor 34 serves to by-pass the voltage source at radio frequencies. The anode 4 is electron coupled to the oscillating section of the tube. The tank circuit 22 is tuned to the operating frequency of the oscillation circuit. An additional advantage of this particular arrangement is that the oscillator can provide a higher power output without decreasing the oscillator stability.

The term "ground" as used herein is not to be construed as being limited to an earthed connection but is deemed to include any point of reference potential, such as a point of fixed or zero radio frequency potential.

It should be understood that the two crystals need not be of the same cut or have the same mounting or vibrational mode nor need they be different from each other in these respects. The important requirement is that one crystal presents a low impedance at the frequency of operation and the other presents a high impedance at the same frequency.

The invention claimed is:

1. A highly stable crystal oscillator comprising an electron discharge device having an anode, a grid and a cathode, a piezo-electric crystal exhibiting parallel resonance at the frequency of operation connected between said grid and ground, a grid resistor in parallel with said crystal, a second piezo-electric crystal selected to exhibit series resonance at said frequency connected from said cathode to ground, an impedor having a relatively large reactance compared to the reactance of said second crystal connected in parallel with said second crystal, a voltage source with a positive terminal and a negative terminal, the negative terminal of said source being connected to ground, and an inductor connected between said anode and said positive terminal of said voltage source.

2. A highly stable crystal oscillator comprising an electron discharge device having an anode, a grid and a cathode, a piezo-electric crystal selected to exhibit parallel resonance at the frequency of operation connected between said grid and ground, a grid resistor in parallel with said crystal, a piezo-electric cathode crystal exhibiting series resonance at said frequency connected between said cathode and ground, an inductor connected in parallel with said cathode crystal, an anode voltage source having a negative terminal and a positive terminal, said negative terminal being connected to ground, an anode tank circuit comprising an inductor and capacitor in parallel, said anode circuit being connected between said anode and said positive terminal of said anode voltage source.

3. A highly stable crystal oscillator operating at a given frequency comprising an electron discharge device having an anode, a control grid and a cathode, a piezo-electric crystal connected between said control grid and a point of fixed potential, a second piezo-electric crystal exhibiting series resonance at said given frequency connected between said cathode and said point of fixed potential, an inductor connected in parallel with said second crystal, a connection capable of passing direct current connecting said control grid and said point of fixed potential, a voltage source with a positive terminal and a negative terminal, said negative terminal being connected to said point of fixed potential, and an inductor connected between said anode and said positive terminal of said voltage source.

4. A highly stable crystal oscillator operating at a given frequency comprising an electron discharge device having an anode, a control grid and a cathode, a piezo-electric crystal connected between said control grid and ground, a grid resistor connected from said control grid to ground, a second piezo-electric crystal exhibiting series resonance at said given frequency connected between said cathode and ground, a radio frequency choke connected in parallel with said second crystal, and a tuned circuit connected between said anode and ground.

5. A highly stable crystal oscillator operating at a given frequency comprising an electron discharge device having an anode, a screen grid, a control grid and a cathode, a piezo-electric crystal connected between said control grid and said screen grid, a grid resistor connected between said control grid and ground, a bypass capacitor connected in parallel with said resistor, a second piezo-electric crystal exhibiting series resonance at said given frequency connected between said cathode and ground, a radio frequency choke connected in parallel with said second crystal, an anode voltage source with a positive terminal and a negative terminal, said negative terminal being connected to ground, an anode tank circuit having a variable capacitor in parallel with an inductor, said tank circuit being connected between said anode and said positive terminal of said voltage source, a radio frequency choke connected between said screen grid and said positive terminal of said voltage source, and a by-pass capacitor connected between said screen grid and ground.

6. A highly stable crystal oscillator, comprising an electron discharge device having an anode, a grid, and a cathode, a piezoelectric crystal exhibiting parallel resonance at the frequency of operation connected between said grid and ground, a grid resistor connected in parallel with said crystal, a second piezoelectric crystal exhibiting series resonance at said frequency connected from said cathode to ground, an impedance having a value larger than the impedance of said second crystal at said frequency connected in parallel with said second crystal, a voltage source with a positive terminal and a negative terminal, the negative terminal of said source being connected to ground, and an inductor connected between said anode and said positive terminal of said voltage source.

7. A crystal controlled oscillator, comprising a controlled electron flow device having an electron emission electrode, an electron flow controlling electrode, and an electron collecting electrode, a first piezoelectric crystal that is parallel resonant to the frequency of operation of said oscillator, means coupling one terminal of said crystal to said flow controlling electrode, means coupling the other terminal of said first crystal to a point of reference potential over a path capable of passing direct current, a second piezoelectric crystal that is series resonant to said frequency of operation, means connecting said second crystal between said emission electrode and said point of reference potential, an impedance having a value larger than the impedance presented by said second crystal at said operating frequency connected in parallel with said second crystal, and an output network including an inductance coupled between said collecting electrode and said point of reference potential.

References Cited in the file of this patent

UNITED STATES PATENTS

| | | |
|---|---|---|
| 2,044,137 | Tunick | June 16, 1936 |
| 2,115,858 | Keall | May 3, 1938 |
| 2,459,842 | Royden | Jan. 25, 1949 |
| 2,598,722 | Richards | June 3, 1952 |

FOREIGN PATENTS

| | | |
|---|---|---|
| 862,564 | France | Mar. 12, 1941 |